United States Patent
Young et al.

[15] 3,696,587
[45] Oct. 10, 1972

[54] ADSORPTION PROCESS FOR RECOVERING EASY-TO-REGENERATE CONDENSIBLE COMPONENTS FROM A MULTICOMPONENT GAS STREAM

[72] Inventors: Gary Clifford Young, Pawhuska; Joseph A. Kleinpeter, Ponca City, both of Okla.

[73] Assignee: Continental Oil Company, Ponca City, Okla.

[22] Filed: April 2, 1971

[21] Appl. No.: 130,691

[52] U.S. Cl..................................................55/62
[51] Int. Cl. ............................................B01d 53/04
[58] Field of Search................................55/62, 179

[56] References Cited

UNITED STATES PATENTS 3,243,938  4/1966  Lavery et al..................55/62

*Primary Examiner*—Charles N. Hart
*Attorney*—Joseph C. Kotarski, Henry H. Huth, Robert B. Coleman, Jr., Gerald L. Floyd and Caroll Palmer

[57] ABSTRACT

The present invention relates to an improved cyclic adsorption process for recovering easy-to-regenerate condensible components from a multi-component gas stream. After contact with the inlet gas stream the adsorbent bed or beds containing easy and difficult-to-regenerate components are regenerated by contact with a lean regeneration gas stream. The resulting rich regeneration gas stream is contacted with a liquid stream consisting primarily of easy-to-regenerate components so that a major portion of the difficult-to-regenerate components contained therein are absorbed and removed by the liquid stream. The remaining rich regeneration gas stream is cooled so that easy-to-regenerate components and additional difficult-to-regenerate components contained therein are condensed thereby producing the liquid stream comprised primarily of easy-to-regenerate components used to contact the rich regeneration gas stream and a lean regeneration gas stream of a minimum difficult-to-regenerate component content. The lean regeneration gas stream is heated and recirculated in a closed circuit into contact with the bed or beds being regenerated thereby causing a maximum quantity of the difficult-to-regenerate components to be removed from the bed or beds and maximum bed easy-to-regenerate component adsorption capacity to be realized.

8 Claims, 1 Drawing Figure

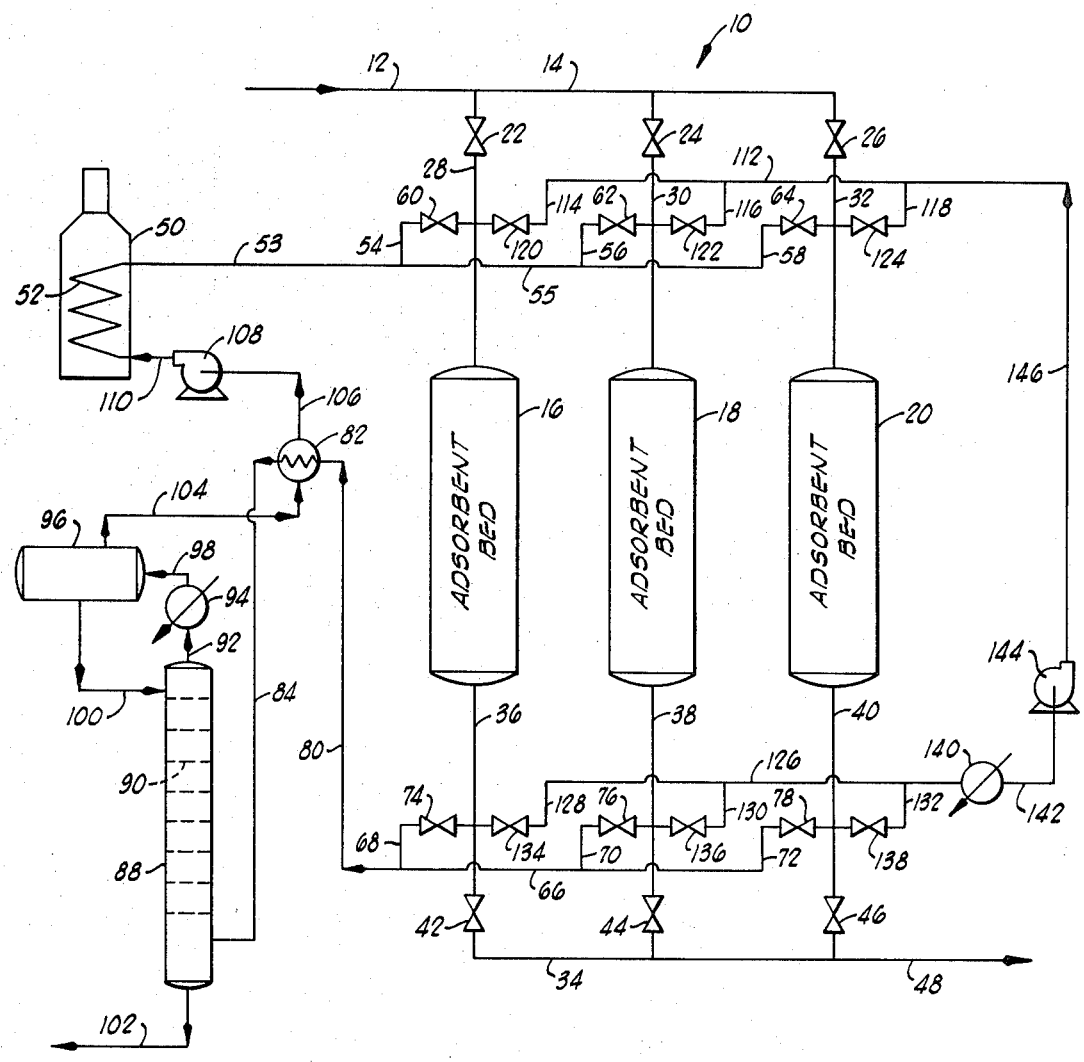

ADSORPTION PROCESS FOR RECOVERING EASY-TO-REGENERATE CONDENSIBLE COMPONENTS FROM A MULTICOMPONENT GAS STREAM

BACKGROUND OF THE INVENTION

1. Field of the Invention

The present invention relates to an improved adsorption process for recovering condensible components from a multi-component gas stream, and more particularly, but not by way of limitation, to a cyclic adsorption process of the type wherein one or more beds of solid adsorbent are contacted with an inlet gas stream so that condensible components are adsorbed thereon, then contacted by a heated regeneration gas stream so that the components are desorbed from the bed or beds and then contacted with a cooling gas stream preparatory to again being contacted with the inlet gas stream.

2. Description of the Prior Art

Many various vapor adsorption processes have been developed of the type wherein one or more beds are utilized for adsorbing condensible components from a gas stream while the other beds are being regenerated. Regeneration of the bed or beds which are saturated with condensible components is accomplished by heating the bed or beds with a heated regeneration gas stream which causes the condensible components to be desorbed from the bed. The desorbed components are then condensed and removed from the regeneration gas stream. The hot bed which has been regenerated is cooled by contacting it with a cooling gas stream preparatory to again being contacted with the inlet gas stream. The various gas streams are continuously switched or cycled so that the bed or beds which have just contacted the inlet gas stream are contacted with the heated regeneration gas stream, the bed or beds which have just been contacted with the heated regeneration gas stream are contacted with the cooling gas stream, and the bed or beds which have just been contacted with the cooling gas stream are contacted with the inlet gas stream.

Commonly, adsorption process of the type described herein are used for recovering desired condensible components from a multi-component gas stream containing both easy-to-regenerate and difficult-to-regenerate adsorbable condensible components. That is, some of the adsorbable components contained in the gas stream are readily removed from the adsorbent by the contact thereof with a heated regeneration gas stream, while other of the components require extensive contact of the adsorbent with the heated regeneration gas stream before they are desorbed and removed. For example, natural gas usually contains adsorbable hydrocarbon compounds which are relatively easy to regenerate, such as methane and ethane, as well as adsorbable hydrocarbon compounds which are increasingly difficult to regenerate, such as propane, butanes and heavier hydrocarbon compounds. In an adsorption process wherein a bed of adsorbent is contacted with a multi-component gas stream containing both difficult and easy-to-regenerate adsorbable components, all of the adsorbable components are adsorbed on the bed to some degree. The most difficult-to-regenerate components are adsorbed vigorously and the other adsorbable components are adsorbed to a lesser extent in the order of their degree of difficulty to regenerate. For example, when an adsorbent such as activated carbon is contacted with a gas stream containing methane, ethane and propane, the propane is adsorbed more vigorously than ethane, with methane being adsorbed to a lesser degree. When the activated carbon is regenerated by contact with a heated regeneration gas stream the adsorbed hydrocarbon compounds such as propane are more difficult to desorb than ethane with methane the easiest to desorb.

It has heretofore been recognized that the most effective regeneration of an adsorbent bed with a heated regeneration gas stream is accomplished with a lean regeneration gas stream. That is, a regeneration gas stream as devoid of the components to be desorbed from the bed or beds as possible achieves the most effective regeneration. Heretofore, in order to obtain as lean a heated regeneration gas stream as possible for contacting the adsorbent beds, systems utilizing closed regeneration gas stream circuits have been utilized. The term "closed circuit" is used herein to mean a system of conduits, valves, pumps, etc., within which a gas stream is continuously recirculated without the continuous addition or removal of gas therefrom. The condensible components desorbed into the regeneration gas stream as it contacts the adsorbent are condensed and removed therefrom, and the resulting lean regeneration gas stream is heated prior to being recirculated through the adsorbent. However, even where a closed regeneration gas stream circuit is used, the lean regeneration gas stream remaining after desorbed components have been condensed and separated therefrom contains quantities of both the easy and difficult-to-regenerate components due to the well known vapor-liquid equilibrium behavior of multi-component systems. Further, because the lean regeneration gas stream contains difficult-to-regenerate components, a relatively high regeneration gas stream rate and/or contact time is required to remove difficult-to-regenerate components absorbed on the bed or beds being regenerated. This problem becomes particularly difficult in applications where an adsorption process of the type herein described is utilized for recovering easy-to-regenerate components from a multi-component gas stream containing both difficult and easy-to-regenerate components. In order to adsorb a major portion of the easy-to-regenerate components contained in the inlet gas stream, the cycle time, i.e., the time the inlet gas stream is allowed to contact each adsorbent bed, must be limited. This is because the difficult-to-regenerate components are adsorbed most readily on the bed, and with increasing contact time the quantity of difficult-to-regenerate components adsorbed on the bed increases thereby reducing the bed adsorption capacity for easy-to-regenerate components. Due to this limited cycle time in combination with difficult-to-regenerate components being contained in the regeneration gas stream, adequate regeneration of the adsorbent is difficult to achieve, and over a period of time adsorbed difficult-to-regenerate components build up on the adsorbent reducing its capacity for easy-to-regenerate components thereon.

By the present invention, an improved adsorption process for recovering easy-to-regenerate components from a multi-component gas stream is provided wherein the desorbed condensible components are removed from the rich regeneration gas stream in a manner such that a lean regeneration gas stream of minimum difficult-to-regenerate component content is produced.

SUMMARY OF THE INVENTION

The present invention relates to an adsorption process for recovering easy-to-regenerate condensible components from a multi-component inlet gas stream wherein a fixed adsorbent bed is contacted with the inlet gas stream so that both difficult and easy-to-regenerate condensible components contained therein are adsorbed on the bed, then contacted with a heated lean regeneration gas stream so that the adsorbed components are desorbed therefrom into the regeneration gas stream, the desorbed condensible components being condensed and removed from the rich regeneration gas stream thereby producing a lean regeneration gas stream and then contacted with a cooling gas stream so that it is cooled preparatory to again contacting the inlet gas stream.

By the present invention desorbed condensible components are removed from the rich regeneration gas stream by intimately contacting the rich regeneration gas stream with a liquid stream consisting primarily of condensed easy-to-regenerate components so that a portion of the difficult-to-regenerate components contained therein are absorbed and removed therefrom by the liquid stream. The liquid stream is withdrawn from the process and the remaining rich regeneration gas stream is cooled so that easy-to-regenerate and additional difficult-to-regenerate condensible components contained therein are condensed. The condensed components are separated from the regeneration gas stream thereby producing a lean regeneration gas stream of minimum difficult-to-regenerate component content and the liquid stream consisting primarily of easy-to-regenerate components which is used to contact the rich regeneration gas stream.

It is, therefore, an object of the present invention to provide an improved adsorption process for recovering easy-to-regenerate condensible components from a multi-component gas stream.

A further object of the present invention is the provision of an improved adsorption process wherein the lean regeneration gas stream is of a minimum difficult-to-regenerate component content thereby achieving maximum removal of difficult-to-regenerate components from the adsorbent bed being regenerated.

Other and further objects, features and advantages of the present invention will be apparent from the following description of presently preferred embodiments of the invention, given for the purpose of disclosure and taken in conjunction with the accompanying drawing.

DESCRIPTION OF THE DRAWING

In the drawing, one system which may be used for carrying out the improved process of the present invention is illustrated in diagrammatic form.

DESCRIPTION OF THE PREFERRED EMBODIMENTS

Referring to the drawing, a system which may be used for carrying out the improved process of the present invention is illustrated in diagrammatic form and generally designated by the numeral 10. An inlet multicomponent gas stream containing easy-to-regenerate condensible components to be recovered enters the system 10 by way of the conduit 12. The conduit 12 is connected to an inlet gas header 14 from where the inlet gas stream is routed to one of three vessels 16, 18 and 20, each of which contains a stationary bed of solid adsorbent material. A variety of commercially available adsorbent materials well known to those skilled in the art may be utilized in the system 10. For example, adsorbent materials such as activated carbon, activated alumina and a variety of silica compounds are commonly used for adsorbing condensible hydrocarbon components from natural gas streams. Conduits 28, 30 and 32 are connected to the inlet connections of the vessels 16, 18 and 20, respectively, and to the inlet gas stream header 14. Valves 22, 24 and 26 are disposed in the conduits 28, 30 and 32, respectively. A residue gas outlet header 34 is provided connected to the outlet connections of the vessels 16, 18 and 20 by conduits 36, 38 and 40, respectively. Valves 42, 44 and 46 are disposed in the conduits 36, 38 and 40. The main residue gas header 34 is connected to a conduit 48 which conducts the residue gas from the system 10 to a point of use of further processing.

A closed regeneration gas stream circuit for continuously regenerating one of the adsorbent beds contained within the vessels 16, 18 and 20 is provided. A conventional gas stream heater 50 is provided in the regeneration gas stream circuit having a coil 52 disposed therein. The regeneration gas stream inlet header 55 is connected to the outlet connection of the heating coil 52 by conduit 53. The header 55 is connected by conduits 54, 56 and 58 to conduits 28, 30 and 32 respectively. Valves 60, 62 and 64 are disposed in the conduits 54, 56 and 58 respectively. A regeneration gas stream outlet header 66 is provided for receiving the rich regeneration gas stream from the vessels 16, 18 and 20. Conduits 68, 70 and 72 are connected to the header 66 and to the conduits 36, 38 and 40. Valves 74, 76 and 78 are disposed in the conduits 68, 70 and 72, respectively. The header 66 is connected by a conduit 80 to a conventional rich regeneration gas-lean regeneration gas heat exchanger 82. The rich regeneration gas stream outlet of the heat exchanger 82 is connected by a conduit 84 to the lower portion of a vessel 88 containing a plurality of conventional vapor-liquid contact trays 90. The gas outlet connection of the vessel 88 is connected by a conduit 92 to a conventional gas cooler 94. The discharge connection of the cooler 94 is connected to a conventional vapor liquid separator 96 by a conduit 98. Liquid separated in the separator 96 is conducted to the upper portion of the vessel 88 by a conduit 100. Liquid accumulating in the bottom portion of the vessel 88 is removed therefrom by a conduit 102. The gas outlet connection of the separator 96 is connected to an exchanger 82 by a conduit 104. From the exchanger 82 the separator off-gas is connected by a conduit 106 to a conventional gas booster or compressor 108. The discharge of the compressor 108 is connected by a conduit 110 to the heating coil 52 of the heater 50.

A closed cooling gas stream circuit is provided comprised of a cooling gas stream inlet header 112 which is connected to the vessels 16, 18 and 20 by way of conduits 114, 116 and 118. The conduits 114, 116 and 118 are connected to the conduits 28, 30 and 32 and to the header 112. Valves 120, 122 and 124 are disposed in the conduits 114, 116 and 118 respectively. A cooling gas stream outlet header 126 is provided for receiving the cooling gas stream from the vessels 16, 18 and 20. The header 126 is connected by conduits 128, 130 and 132 to the conduits 36, 38 and 40 respectively. Valves 134, 136 and 138 are disposed in the conduits 128, 130 and 132 respectively. The header 126 is connected to the inlet of a conventional gas cooler 140, and the discharge connection of the cooler 140 is connected by a conduit 142 to a conventional gas booster or compressor 144. The discharge of the compressor 144 is connected to the cooling gas stream inlet header 112 by a conduit 146.

The various valves described above may be any of a variety of pneumatically, hydraulically or electrically operated control valves, either two-way or three-way. The sequential opening and closing of the valves is automatically controlled by a conventional cycle controller, either time or temperature actuated. The cycle controller functions to open certain of the valves and close others at the beginning of each cycle so that the flow patterns of the inlet gas, regeneration gas and cooling gas streams passing through the system 10 are successively changed in a predetermined manner, as will be described further hereinbelow.

The regeneration and cooling gas stream circuits of the system 10 are of the closed type. As will be understood, other types of regeneration and cooling gas stream circuits known in the art as "open" circuits may be utilized. Further, when closed circuits of the type illustrated in the drawing and described above are used, controls (not shown) are provided for maintaining the gas volume circulated at a relatively constant level. In addition, volume-temperature compensators of the type described in U.S. Letters Pat. No. 3,405,507 dated Oct. 15, 1968, and assigned to the assignee of this present invention, may be utilized in conjunction with the regeneration and cooling gas circuits to provide compensation for volume and temperature changes therein. While three vessels containing beds of solid adsorbent have been described, it will be understood that a variety of cyclic adsorption systems may be utilized for carrying out the improved process of the present invention, which systems may include any number of adsorbent beds, open or closed regeneration gas and cooling gas stream circuits, etc.

OPERATION OF THE SYSTEM 10

In operation of the system 10, a multi-component inlet gas stream containing easy-to-regenerate condensible components to be recovered flows into the system 10 by way of the conduit 12 and into one of the vessels 16, 18 or 20. Let it be assumed that the adsorbent bed contained within the vessel 16 is adsorbing condensible components from the inlet gas stream. The inlet gas stream flows by way of valve 22 and conduit 28 into the vessel 16. Valves 24 and 26 and conduits 30 and 32 serve a similar purpose when the adsorbent beds within the vessels 18 and 20 are contacted with the inlet gas stream. In passing through the vessel 16, the inlet gas stream contacts the solid adsorbent bed contained therein so that the desired easy-to-regenerate condensible components contained therein are adsorbed on the bed and removed from the gas stream. The resultant residue gas stream exits the vessel 16 by way of conduit 36 and valve 42, and is passed into the residue gas stream header 34. Valves 44 and 46 and conduits 38 and 40 serve similarly to conduct the residue gas stream to the header 34 during subsequent cycles. From the header 34 the residue gas stream is removed from the system 10 by way of the conduit 48 from where it is conducted to a point of use or further processing.

When the bed of adsorbent material within the vessel 16 becomes substantially loaded with adsorbed condensible components, it is regenerated by passing through it a heated regeneration gas stream. Let it be assumed that the adsorbent bed contained within the vessel 18 is to be regenerated. A lean heated regeneration gas stream is passed from the regeneration gas stream inlet header 55 into the vessel 18 by way of conduit 56, valve 62 and conduit 30. Conduits 54, 28, 58 and 32 and valves 60 and 64 serve similarly when the adsorbent beds in the vessels 16 and 20 are being regenerated. As the heated regeneration gas stream passes through the adsorbent bed contained within the vessel 18 it heats the adsorbent and causes both easy-to-regenerate and difficult-to-regenerate components adsorbed thereon to be desorbed into the regeneration gas stream. The resulting rich regeneration gas stream containing the desorbed components flows from the vessel 18 by way of conduit 38, conduit 70 and valve 76 into the rich regeneration gas stream outlet header 66. Conduits 36, 68, 40 and 72 and valves 74 and 78 serve similarly during subsequent cycles. From the header 66 the rich regeneration gas stream passes by way of conduit 80 into the heat exchanger 82. While passing through the heat exchanger 82 the rich regeneration gas stream is cooled by exchange of heat with the lean regeneration gas stream. The cooled rich regeneration gas stream then passes by way of conduit 84 to the lower portion of the vessel 88 and passes upwardly through the vapor liquid contact trays 90 contained therein. As the rich regeneration gas stream travels through the vessel 88, it is contacted by liquid passing downwardly over the trays 90 within the vessel 88, which liquid consists primarily of easy-to-regenerate components as will be described further herein. As the rich regeneration gas stream is intimately contacted by the liquid stream, a portion of the difficult-to-regenerate components contained in the rich regeneration gas stream is absorbed by the liquid stream and removed from the rich regeneration gas stream. The absorbent liquid accumulates in the bottom portion of the vessel 88 and is removed therefrom by way of conduit 102. From conduit 102, the liquid stream containing both difficult and easy-to-regenerate components may be conducted to a conventional fractionation system wherein the desired easy-to-regenerate components are separated therefrom.

The rich regeneration gas stream having a portion of the difficult-to-regenerate components removed therefrom by contact with the liquid stream exits the vessel 88 by way of conduit 92 and is passed to the inlet of the gas cooler 94. While passing through the gas cooler 94 easy-to-regenerate and additional difficult-to-regenerate condensible components contained in the regeneration gas stream are condensed.

The resultant liquids and regeneration gas stream pass from the gas cooler 94 by way of conduit 98 into the separator 96. While within the separator 96 the liquids consisting primarily of easy-to-regenerate components are separated from the regeneration gas stream thereby producing a lean regeneration gas stream of minimum difficult-to-regenerate component content. A continuous stream of the liquid consisting primarily of easy-to-regenerate components is withdrawn from the separator 96 by way of the conduit 100 and passed into the upper portion of the vessel 88. As previously described this stream of liquid passes downwardly in the vessel 88 intimately contacting the rich regeneration gas stream and removing difficult-to-regenerate components therefrom. The lean regeneration gas stream exits the separator 96 by way of a conduit 104 and is conducted to the heat exchanger 82 wherein it is preheated by heat exchange with the rich regeneration gas stream as previously described. The preheated lean regeneration gas stream then passes by way of conduit 106 into the suction of the gas compressor 108. From the discharge of the compressor 108, the lean regeneration gas stream passes by way of conduit 110 through the heating coil 52 of the heater 50 wherein it is heated, and back to the regeneration gas stream inlet header 55 by way of conduit 53.

When an adsorbent bed has been regenerated by contact with the heated lean regeneration gas stream, it must be cooled before it can again contact the inlet gas stream. Let it be assumed that the bed of adsorbent material within the vessel 20 is in the process of being cooled. A cooling gas stream is passed from the cooling gas stream inlet header 112 into the vessel 20 by way of conduit 118, valve 124 and conduit 32. Conduits 114, 28, 116 and 30, and valves 120 and 122 serve similarly during subsequent cycles. The adsorbent bed contained within the vessel 20 is contacted by the cooling gas stream passing therethrough which causes the bed to be cooled. From the vessel 20 the cooling gas stream is passed into the cooling gas stream outlet header 126 by way of conduit 40, conduit 132 and valve 138. Conduits 36, 128, 38 and 130 and valves 134 and 136 serve similar purposes. From the header 126, the cooling gas stream passes into the gas cooler 140 wherein heat removed from the adsorbent bed contained within the vessel 20 by the cooling gas stream is removed from the cooling gas stream. From the gas cooler 140, the cooling gas stream is passed by way of conduit 142 to the gas booster or compressor 144. The compressor 144 functions to boost the pressure of the cooling gas stream so that it passes by way of conduit 146 back to the cooling gas stream inlet header 112.

As will be understood by those skilled in the art, the operation o the vessel 88, cooler 94 and separator 96 is similar to a conventional rectification column. Due to the intimate contact of the rich regeneration gas stream with a liquid stream consisting primarily of easy-to-regenerate components, a portion of the difficult-to-regenerate components are absorbed therefrom, and by further cooling of the rich regeneration gas stream in the gas cooler 94, additional difficult-to-regenerate components as well as the desired easy-to-regenerate components are condensed and separated from the regeneration gas stream. The liquid product stream removed from the vessel 88 by way of conduit 102 contains more of the difficult-to-regenerate components as compared to prior art processes, and as a result, the regeneration gas stream remaining is leaner, or of a difficult-to-regenerate component content which is less than that obtainable by prior art processes. Due to the fact that the regeneration gas is leaner, an increased quantity of difficult-to-regenerate components are removed from the adsorbent bed during the regeneration thereof, thereby increasing the capacity of the bed for the desired easy-to-regenerate components. For example, in processing a natural gas stream for the recovery of ethane, where the natural gas stream contains methane, ethane and propane and heavier hydrocarbon compounds, the methane and ethane are easy to regenerate as compared to the propane and heavier hydrocarbon compounds. By the present invention, the lean regeneration gas stream contains a minimum quantity of propane and heavier hydrocarbon compounds, thereby removing a greater quantity of these compounds during the regeneration of the adsorbent beds which results in a greater ethane adsorption capacity and a longer adsorbent life as compared to prior art processes used for recovering ethane from natural gas streams.

In order to present a clear understanding of the system 10, the adsorbent bed and valve sequence for three complete cycles is shown in Table I below.

TABLE I

Adsorbent Bed and Valve Sequence For System 10

| | First Cycle | Second Cycle | Third Cycle |
|---|---|---|---|
| Adsorbent Bed Vessel | | | |
| 16 | Adsorbing | Heating | Cooling |
| 18 | Heating | Cooling | Adsorbing |
| 20 | Cooling | Adsorbing | Heating |
| Valves | | | |
| 22 | Open | Closed | Closed |
| 24 | Closed | Closed | Open |
| 26 | Closed | Open | Closed |
| 42 | Open | Closed | Closed |
| 44 | Closed | Closed | Open |
| 46 | Closed | Open | Closed |
| 60 | Closed | Open | Closed |
| 62 | Open | Closed | Closed |
| 64 | Closed | Closed | Open |
| 74 | Closed | Open | Closed |
| 76 | Open | Closed | Closed |
| 78 | Closed | Closed | Open |
| 120 | Closed | Closed | Open |
| 122 | Closed | Open | Closed |
| 124 | Open | Closed | Closed |
| 134 | Closed | Closed | Open |
| 136 | Closed | Open | Closed |
| 138 | Open | Closed | Closed |

In order to further illustrate the improved process of the present invention, the following examples are given.

EXAMPLE 1

For a natural gas stream of the composition given in Table II below, at inlet conditions of 100° F and 600 psia, and using 4,000 pounds of activated carbon adsorbent per 1.0 mmscf/day of inlet gas, the optimum cycle time for the recovery of maximum quantities of ethane is 30 minutes.

TABLE II

Composition of Inlet Gas Stream

| Component | Concentration (Mol %) |
|---|---|
| air | 1.9 |
| $CO_2$ | 0.6 |
| $C_1$ | 91.7 |
| $C_2$ | 3.6 |
| $C_3$ | 1.3 |
| $C_{4+}$ | 0.9 |
| Total: | 100.0 |

A regeneration gas stream of 375 scf/day/pound of adsorbent at 600° F and 600 psia is required to regenerate the adsorbent. The composition of the lean regeneration gas stream produced in a conventional process wherein the desorbed ethane and heavier hydrocarbon compounds are condensed and separated therefrom at a temperature of 80° F and 600 psia is given in Table III below.

TABLE III

Composition of Lean Regeneration Gas Stream by Conventional Process

| Component | Concentration (Mol %) | |
|---|---|---|
| $C_1$ | 64.0 | |
| $C_2$ | 18.0 | |
| $C_3$ ⎫ $C_{3+}$ | 12.0 ⎫ | 18.0 |
| $C_{4+}$ ⎭ | 6.0 ⎭ | |
| Total: | 100.0 | |

Contact of the adsorbent with the lean regeneration gas stream given in Table III at 600° F and 600 psia results in the regeneration of the adsorbent to the values given in Table IV below at the cycle time and other conditions given above.

TABLE IV

Quantity of Components Remaining Adsorbed After Regeneration by Conventional Process

| Component | Quantity of Component Remaining Adsorbed (lb Combonent/100 lb Adsorbent) | |
|---|---|---|
| $C_1$ | 0.35 | |
| $C_2$ | 0.55 | |
| $C_3$ ⎫ $C_{3+}$ | 2.56 ⎫ | 9.17 |
| $C_{4+}$ ⎭ | 6.61 ⎭ | |

By the process of the present invention, at the same conditions given above, the lean regeneration gas stream is of the composition given in Table V below.

TABLE V

Composition of Lean Regeneration Gas Stream by the Process of Present Invention

| Component | Concentration (Mol %) | |
|---|---|---|
| $C_1$ | 70.0 | |
| $C_2$ | 21.0 | |
| $C_3$ ⎫ $C_{3+}$ | 6.0 ⎫ | 9.0 |
| $C_4$ ⎭ | 3.0 ⎭ | |

Upon contact of the adsorbent with the lean regeneration gas stream given in Table V at 600° F and 600 psia, the adsorbent is regenerated to the values given in Table VI below.

TABLE VI

Quantity of Components Remaining Adsorbed After Regeneration by the Present Invention

| Component | Quantity of Component Remaining Adsorbed (lb Component/100 lb Adsorbent) | |
|---|---|---|
| $C_1$ | 0.51 | |
| $C_2$ | | 0.84 |
| $C_3$ ⎫ $C_{3+}$ | 1.78 ⎫ | 6.74 |
| $C_4$ ⎭ | 4.96 ⎭ | |

Thus, it may be seen that by the present invention the lean regeneration gas produced contains less of the difficult-to-regenerate components, i.e., propane and heavier hydrocarbon compounds as compared to the lean regeneration gas stream produced in a conventional process. Further, it may be seen that more propane and heavier hydrocarbon components are removed from the adsorbent by the regeneration gas stream of the present invention which results in a greater adsorbent capacity for the desired ethane.

EXAMPLE 2

A 100 mmscf/day natural gas stream of the composition given given in Table VII below at inlet conditions of 400 psia and 100° F is processed by the system 10 shown in the drawing with the desired easy-to-regenerate condensible components being ethane and the difficult-to-regenerate components being propane and heavier hydrocarbon compounds contained therein.

TABLE VII

Composition of Inlet Gas Stream

| Component | Concentration (Mol %) |
|---|---|
| Air | 1.92 |
| Carbon Dioxide | 0.56 |
| Methane | 91.73 |
| Ethane | 3.61 |
| Propane | 1.29 |
| Iso-Butane | 0.36 |
| Normal Butane | 0.30 |
| Iso-pentane | 0.12 |
| Normal Pentane | 0.08 |
| Hexane Plus | 0.03 |
| Total: | 100.00 |

133,000 pounds of activated carbon adsorbent material are contained in each of the vessels 16, 18 and 20, and a cycle time of 30 minutes is used. During a first cycle as shown in TABLE I, the inlet gas stream contacts the adsorbent bed contained within the vessel 16, and a 95 mmscf/day residue gas stream is produced which is withdrawn from the system 10 by way of the conduit 48 at an average temperature of 120° F. Simultaneously, the adsorbent bed contained within the vessel 18 is contacted with a 150 mmscf/day regeneration gas stream. The heated regeneration gas stream is at an inlet temperature of 600° F and exits the vessel 18 at an initial temperature of 120° F, reaching a maximum temperature of 550° F. The regeneration gas stream is cooled to a temperature of 100° F as it passes through the exchanger 82 and is contacted with a 30,000 gallons/day stream of liquid having the composition given in Table VIII below as it leaves the vessel 88.

TABLE VIII

Composition of Liquid Stream Exiting the Vessel 88

| Component | Concentration (Mol %) |
|---|---|
| Carbon Dioxide | 0.3 |
| Methane | 6.7 |
| Ethane | 15.0 |
| Propane | 23.7 |
| Iso-Butane | 12.0 |
| Normal Butane | 15.8 |
| Iso-Pentane | 6.8 |
| Normal Pentane | 6.5 |
| Hexane Plus | 13.2 |
| Total: | 100.0 |

The rich regeneration gas stream exiting the vessel 88 by way of conduit 92 is cooled to a temperature of 80° F as it passes through the cooler 94 resulting in the condensation of 30,000 gallons/day of liquid which is separated from the remaining regeneration gas stream in the separator 96 and passed by way of conduit 100 to the vessel 88. A 30,000 gallons/day stream of liquid hydrocarbons is withdrawn from the bottom portion of the vessel 88 by way of conduit 102.

The remaining lean regeneration gas stream having the composition given in Table IX below exits the separator 96 and passes by way of conduit 104 to the heat exchanger 82.

TABLE IX

Composition of Lean Regeneration Gas Stream

| Component | Concentration (Mol %) |
|---|---|
| Air | 2.0 |
| Carbon Dioxide | 0.72 |
| Methane | 94.5 |
| Ethane | 0.01 |
| Propane | 2.4 |
| Iso-Butane | 0.25 |
| Normal Butane | 0.1 |
| Iso-Pentane | 0.02 |
| Normal Pentane | 0.00 |
| Total: | 100.00 |

While passing through the exchanger 82 the lean regeneration gas stream is heated to 250° F. The lean regeneration gas stream is then passed by the compressor 108 through the heating coil 52 of the heater 50 wherein it is heated to a temperature of 600° F.

A 250 mmscf/day stream of cooling gas is simultaneously passed into the vessel 20 at a temperature of 100° F and reaches a maximum temperature of 550° F. The bed of adsorbent contained within the vessel 20 is cooled to an average temperature of 100° F.

Thus, the present invention is well adapted to carry out the objects and attain the ends and advantages mentioned as well as those inherent therein. While presently preferred embodiments of the invention are given for the purpose of disclosure, numerous changes can be made which will readily suggest themselves to those skilled in the art and which are encompassed within the spirit of the invention disclosed and claimed herein.

What is claimed is:

1. In an adsorption process for recovering easy-to-regenerate condensible components from a multi-component inlet gas stream wherein a fixed adsorbent bed is contacted with said inlet gas stream so that both difficult and easy-to-regenerate condensible components contained therein are adsorbed on said bed, then contacted with a heated lean regeneration gas stream so that said adsorbed components are desorbed therefrom into said regeneration gas stream and a desorbed condensible component rich regeneration gas stream is produced, the desorbed condensible components being condensed and removed from the rich regeneration gas stream thereby producing a lean regeneration gas stream, and then contacted with a cooling gas stream so that it is cooled preparatory to again contacting said inlet gas stream, the improvement in removing desorbed condensible components from said rich regeneration gas stream which comprises:
   a. intimately contacting said rich regeneration gas stream with a liquid stream consisting primarily of condensed easy-to-regenerate components so that a portion of the difficult-to-regenerate components contained therein is adsorbed and removed therefrom by said liquid stream;
   b. withdrawing said liquid stream from said process;
   c. cooling the remaining rich regeneration gas stream from step (a) so that easy-to-regenerate and remaining difficult-to-regenerate condensible components contained therein are condensed; and
   d. separating the components condensed in step (c) from said regeneration gas stream thereby producing a lean regeneration gas stream of a minimum difficult-to-regenerate component content and a liquid stream consisting primarily of easy-to-regenerate components for use in step (a).

2. The process of claim 1 which is further characterized to include the step of separating the withdrawn liquid stream of step (b) into fractions to obtain an easy-to-regenerate component liquid product.

3. The process of claim 1 wherein the inlet gas stream is natural gas, the easy-to-regenerate condensible components contained therein are methane and ethane and the difficult-to-regenerate condensible components contained therein are propane and heavier hydrocarbon compounds.

4. The process of claim 3 wherein the adsorbent is activated carbon.

5. A cyclic adsorption process for recovering easy-to-regenerate condensible components from a multi-component inlet gas stream which comprises the steps of:

contacting one or more of a plurality of solid adsorbent beds with said inlet gas stream so that both easy and difficult-to-regenerate condensible components contained therein are adsorbed on said bed or beds;

simultaneously regenerating one or more of said beds so that previously adsorbed condensible components are removed therefrom, comprising the steps of:

a. contacting said bed or beds with a heated lean regeneration gas stream so that adsorbed condensible components are desorbed from said bed or beds into said regeneration gas stream thereby producing a regeneration gas stream rich in said condensible components, b. intimately contacting said rich regeneration gas stream with a liquid stream consisting primarily of easy-to-regenerate components so that a portion of the difficult-to-regenerate components contained in said rich regeneration gas stream is adsorbed and removed therefrom by said liquid stream, c. withdrawing said liquid stream from said process, d. cooling the remaining rich regeneration gas stream from step (a) so that easy-to-regenerate and remaining difficult-to-regenerate condensible components contained therein are condensed, e. separating the components condensed in step (d) from said regeneration gas stream so that a lean regeneration gas stream of minimum difficult-to-regenerate component content and a liquid stream consisting primarily of easy-to-regenerate components for use in step (b) are produced, f. heating the lean regeneration gas stream produced in step (e), and g. recirculating said heated lean regeneration gas stream in a closed circuit into contact with said bed or beds;

simultaneously contacting yet one or more other of said beds with a cooling gas stream so that said bed or beds are cooled preparatory to being contacted with said inlet gas stream; and cycling said inlet gas stream, regeneration gas stream and cooling gas stream so that the bed or beds just contacted with said inlet gas stream are regenerated, the bed or beds just regenerated are contacted with said cooling gas stream and the bed or beds just contacted with said cooling gas stream are contacted with said inlet gas stream.

6. The process of claim 5 which is further characterized to include the step of separating the withdrawn liquid stream of step (c) into fractions to obtain an easy-to-regenerate component liquid product.

7. The process of claim 5 wherein the inlet gas stream is natural gas, the easy-to-regenerate condensible components contained therein are methane and ethane and the difficult-to-regenerate condensible components contained therein are propane and heavier hydrocarbon compounds.

8. The process of claim 7 wherein the adsorbent is activated carbon.

* * * * *